(12) United States Patent
Novosad et al.

(10) Patent No.: US 11,628,944 B2
(45) Date of Patent: Apr. 18, 2023

(54) ACTUATOR FOR USE IN A PISTON ENGINE POWERED AIRCRAFT ACTUATION CONTROL SYSTEM

(71) Applicant: HONEYWELL INTERNATIONAL INC., Charlotte, NC (US)

(72) Inventors: Boris Novosad, Brno (CZ); Zdenek Jasa, Brno (CZ)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 120 days.

(21) Appl. No.: 17/222,126

(22) Filed: Apr. 5, 2021

(65) Prior Publication Data
US 2022/0315235 A1   Oct. 6, 2022

(51) Int. Cl.
*B64D 31/04*   (2006.01)

(52) U.S. Cl.
CPC .................................. *B64D 31/04* (2013.01)

(58) Field of Classification Search
CPC ............................... B64D 31/04; B64D 31/14
See application file for complete search history.

(56) References Cited

U.S. PATENT DOCUMENTS

| 2,134,756 | A | * | 11/1938 | Gerry | B64D 31/04 74/502 |
| 3,599,510 | A | * | 8/1971 | Scott, Sr. | B64D 31/04 74/625 |
| 4,516,063 | A | * | 5/1985 | Kaye | B64C 13/507 123/480 |
| 8,485,057 | B1 | * | 7/2013 | McFarlane | B64D 31/04 74/424.93 |
| 8,523,142 | B2 | | 9/2013 | Mann | |
| 9,016,152 | B2 | | 4/2015 | Jones et al. | |
| 9,624,994 | B2 | | 4/2017 | Yasui et al. | |
| 10,533,647 | B2 | | 1/2020 | Sobolak et al. | |
| 10,711,872 | B1 | | 7/2020 | Doman et al. | |
| 2020/0290729 | A1 | | 9/2020 | Charafeddine et al. | |
| 2021/0371083 | A1 | * | 12/2021 | Lambton | B64C 13/04 |

* cited by examiner

*Primary Examiner* — Christopher D Hutchens
(74) *Attorney, Agent, or Firm* — Lorenz & Kopf, LLP

(57) ABSTRACT

An actuation system for an aircraft piston engine includes a controller and an actuator. The controller selectively supplies motor control signals to a motor. The actuator includes a housing, a motor, a main rod, a control handle, and an inner rod. The main rod receives a drive torque from the motor and translates in either a first axial direction or a second axial direction. The main rod is responsive to an axial drive force to translate in either the first axial direction or the second axial direction. The inner rod is disposed within the main rod and is movable between a first position, in which main rod rotation causes the main rod to translate, and a second position, in which main rod rotation does not cause the main rod to translate, but application of the axial force to the control handle causes the main rod to translate.

18 Claims, 3 Drawing Sheets

ACTUATOR FOR USE IN A PISTON ENGINE POWERED AIRCRAFT ACTUATION CONTROL SYSTEM

TECHNICAL FIELD

The present invention generally relates to actuators, and more particularly relates to an actuator for use in an actuation control system for an aircraft powered by a piston engine.

BACKGROUND

Many general aviation aircraft are powered by a piston engine. The piston engine is coupled to, and rotates, the propeller to thereby generate forward thrust. If the aircraft is a fixed-pitch propeller aircraft, it is equipped with two pilot controls to control the airspeed—a throttle control and a mixture control. If the aircraft is a variable-pitch propeller aircraft, it is equipped with three pilot controls to control the airspeed—a throttle control, a mixture control, and a propeller control.

For both types of aircraft, the throttle control (typically color-coded black) is used to control the amount of fuel and air entering the engine cylinders, and the mixture control (typically color-coded red) is used to adjust the air/fuel mixture. In variable-pitch propeller aircraft, the propeller control (typically color-coded blue) is used to adjust the propeller rotational speed.

Whether the aircraft has two or three controls, each of the controls is mechanically coupled to either the engine carburetor (throttle control, mixture control) or the propeller governor (propeller control) via a control cable, such as a Bowden cable. The aircraft pilot is required to manually adjust each of these controls during flight to attain the appropriate setting. Currently, there is no commercially available product that can be retrofit into existing piston engine powered aircraft to automate each of these controls.

Hence, there is a need for a system that can be readily retrofit into existing piston engine powered aircraft to automate the throttle, mixture, and (when included) propeller controls. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an actuator includes a housing, a motor, a helical guide, an actuation tube, an inner rod, and an inner rod actuator. The motor is mounted on the housing and is coupled to receive motor control signals. The motor is responsive to the motor control signals to rotate and supply a drive torque. The helical guide is disposed at least partially within the housing. The helical guide is coupled to receive the drive torque from the motor and is configured, in response to the drive torque, to rotate in either a first rotational direction or a second rotational direction. The actuation tube is disposed at least partially within the housing and has an inner surface that defines an actuation tube cavity. The actuation tube is at least partially surrounded by the helical guide and is configured, in response to rotation of the helical guide in the first rotational direction or the second rotational direction, to selectively translate in either a first axial direction or a second axial direction, respectively. The inner rod is disposed within, and extends from, the actuation tube cavity. The inner rod is movable between a first position, in which rotation of the helical guide causes the actuation tube to translate, and a second position, in which rotation of the helical guide does not cause the actuation tube to translate. The inner rod actuator is coupled to the inner rod and is configured to move the inner rod between the first position and the second position.

In another embodiment, an actuation control system for an aircraft piston engine includes a controller and an actuator. The controller is configured to selectively supply motor control signals. The actuator is in operable communication with the controller and includes a housing, a motor, a helical guide, an actuation tube, an inner rod, and an inner rod actuator. The motor is mounted on the housing and is coupled to receive the motor control signals. The motor is responsive to the motor control signals to rotate and supply a drive torque. The helical guide is disposed at least partially within the housing. The helical guide is coupled to receive the drive torque from the motor and is configured, in response to the drive torque, to rotate in either a first rotational direction or a second rotational direction. The actuation tube is disposed at least partially within the housing and has an inner surface that defines an actuation tube cavity. The actuation tube is at least partially surrounded by the helical guide and is configured, in response to rotation of the helical guide in the first rotational direction or the second rotational direction, to selectively translate in either a first axial direction or a second axial direction, respectively. The inner rod is disposed within, and extends from, the actuation tube cavity. The inner rod is movable between a first position, in which rotation of the helical guide causes the actuation tube to translate, and a second position, in which rotation of the helical guide does not cause the actuation tube to translate. The inner rod actuator is coupled to the inner rod and is configured to move the inner rod between the first position and the second position.

In yet another embodiment, an actuation control system for an aircraft powered by a piston engine includes a controller and a plurality of actuators. The controller is configured to selectively supply a plurality of motor control signals. The actuators are in operable communication with the controller and each includes a housing, a motor, a helical guide, an actuation tube, an inner rod, and a solenoid. The motor is mounted on the housing and is coupled to receive the motor control signals. The motor is responsive to the motor control signals to rotate and supply a drive torque. The helical guide is disposed at least partially within the housing. The helical guide is coupled to receive the drive torque from the motor and is configured, in response to the drive torque, to rotate in either a first rotational direction or a second rotational direction. The actuation tube is disposed at least partially within the housing and has an inner surface that defines an actuation tube cavity. The actuation tube is at least partially surrounded by the helical guide and is configured, in response to rotation of the helical guide in the first rotational direction or the second rotational direction, to selectively translate in either a first axial direction or a second axial direction, respectively. The inner rod is disposed within, and extends from, the actuation tube cavity. The inner rod is movable between a first position, in which rotation of the helical guide causes the actuation tube to translate, and a second position, in which rotation of the helical guide does not cause the actuation tube to translate.

The solenoid is coupled to the inner rod and is configured to move the inner rod between the first position and the second position.

Furthermore, other desirable features and characteristics of the actuator and the actuation control system for an aircraft powered by a piston engine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
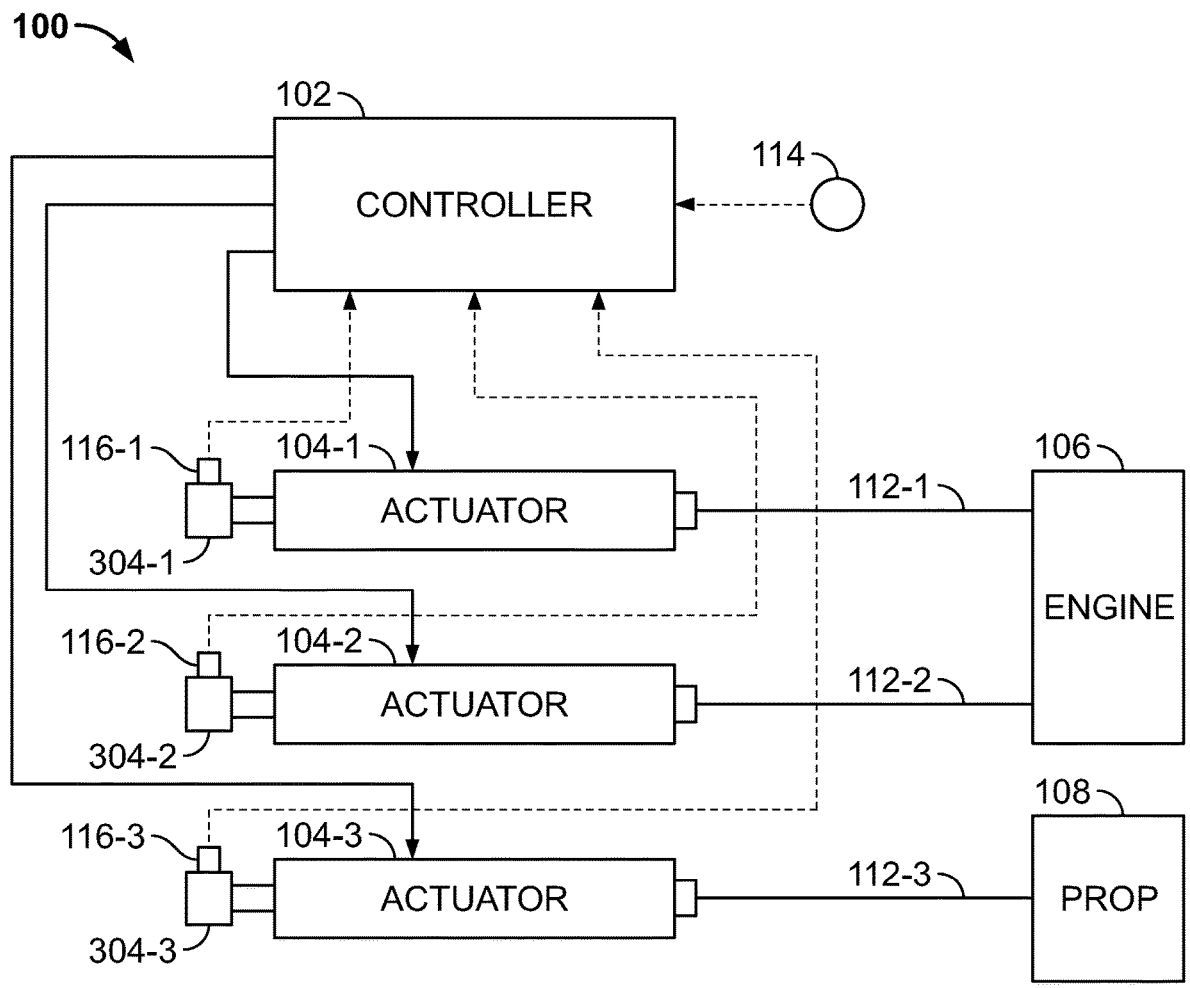
FIG. 1 depicts a functional block diagram of an actuation system for an aircraft powered by a piston engine.

Referring now to FIG. 1, a functional block diagram of one embodiment of an actuation system 100 for an aircraft powered by a piston engine is depicted and includes a controller 102 and a plurality of actuators 104 (104-1, 104-2, 104-3). The controller 102 is configured to selectively supply a plurality of motor control signals to the actuators 104. The controller 102 preferably implements automatic control laws and may be included in, or distributed across, one or more existing avionics systems, or it may be a stand-alone electronic device. Some non-limiting examples of existing avionics systems include a primary flight display (PFD), an autopilot, a flight management system (FMS), a navigation system, and an engine control unit, just to name a few.

The automatic control laws implemented in the controller 102 may be either open-loop or closed-loop controls. Moreover, the control laws may provide one or more basic functions, such as basic airspeed hold, or more advanced functions, such as mixture and thrust/propeller control to optimize fuel consumption or coupling with an active autopilot/flight director mode to provide optimal power settings for a given mode. Regardless of the specific functions, it will be appreciated that the control laws may be implemented as hardware, as software, or various combinations thereof.

Each of the actuators 104 is in operable communication with the controller 102, and each is responsive to the motor control signals it receives to control an associated piston engine aircraft parameter. In the depicted embodiment, the system 100 is included in a variable-pitch propeller aircraft that includes three actuators—104-1, 104-2, 104-3. One actuator 104-1 is used to control the throttle setting of the engine 106, one actuator 104-2 is used to control the air/fuel mixture to the engine 106, and another actuator 104-3 is used to control the propeller 108. It will be appreciated that in other variable-pitch propeller aircraft embodiments, the actuator 104-2 that is used to control the air/fuel mixture to the engine 106 may be a manually controlled actuator, and thus not in operable communication with the controller 102. It will be appreciated that in other embodiments, the system 100 may be included in a fixed-pitch propeller aircraft, which may include only two of the actuators—104-1 and 104-2. It will additionally be appreciated that in other fixed-pitch propeller aircraft embodiments, the actuator 104-2 that is used to control the air/fuel mixture to the engine 106 may be a manually controlled actuator, and thus not in operable communication with the controller 102.

Regardless of the number of actuators 104 included in the system 100, and as FIG. 1 further depicts, each actuator 104 is coupled to its controlled component via a separate control cable 112 (112-1, 112-2, 112-3). In one particular embodiment, each control cable 112 comprises a Bowden cable. Preferably, each actuator 104 is identically configured. One embodiment of an actuator 104 is depicted in FIG. 2, and with reference thereto will now be described.

Figure 2:
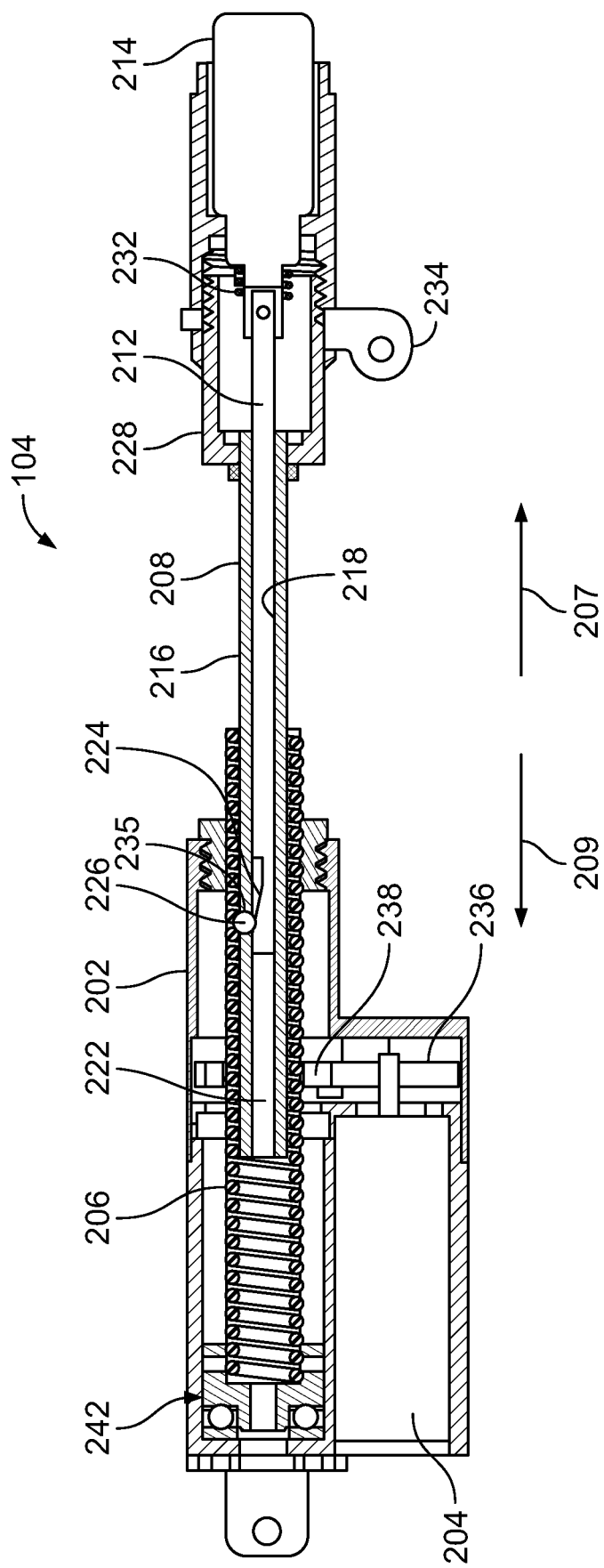
FIG. 2 depicts a partial cross section view of one embodiment of an actuator that may be used to implement the system of FIG. 1.

As FIG. 2 depicts, each actuator 104 includes a housing 202, a motor 204, a helical guide 206, an actuation tube 208, an inner rod 212, and an inner rod actuator 214. The motor 204 is mounted on (or in) the housing 202 and is coupled to receive motor control signals from, for example, the controller 102 (see FIG. 1). The motor 202 is responsive to the received motor control signals to rotate and supply a drive torque. It will be appreciated that the motor 202 may be implemented using any one of numerous types of AC or DC motors. In one particular embodiment, the motor 202 is implemented using a brushed DC motor.

The helical guide 206 is disposed at least partially within the housing 202 and is coupled to receive the drive torque from the motor 204. The helical guide 206 is configured, in response to the drive torque, to rotate in either a first rotational direction or a second rotational direction. In the depicted embodiment, the helical guide 206 is implemented using a helical spring. It will be appreciated, however, that in other embodiments, it could be implemented as part of the housing 202.

The actuation tube 208 is disposed at least partially within the housing 202 and is at least partially surrounded by the helical guide 206. The actuation tube 208 has an outer surface 216 and an inner surface 218, which defines an actuation tube cavity 222. The actuation tube 208 is configured, in response to rotation of the helical guide 206 in the first rotational direction or the second rotational direction, to selectively translate in either a first axial direction 207 or a second axial direction 209, respectively.

The inner rod 212 is disposed within, and extends from, the actuation tube cavity 222. The inner rod 212 is movable between a first position, which is the position depicted in FIG. 2, and a second position, which is not depicted but will be readily understood to those skilled in the art. When the inner rod 212 is in the first position, rotation of the helical guide 206 causes the actuation tube 208 to translate. When the inner rod 212 is in the second position, rotation of the helical guide 206 does not cause the actuation tube 208 to translate; however, as will be described further below, if a force is supplied to the actuation tube 208, it will translate. This functionality is provided by interaction of the helical guide 206, a ramped surface 224, and a detent ball 226, each of which will be described in more detail momentarily.

The inner rod actuator 214 is disposed within an inner rod actuator housing 228 and coupled to the inner rod 212. The inner rod actuator 214 is configured to move the inner rod 212 between the first position and the second position. In the depicted embodiment, the inner rod actuator 214 is implemented using a solenoid that is configured, upon being energized, to move the inner rod 212 to the first position, and is further configured, upon being deenergized, to move the inner rod 212 to the second position. To facilitate this functionality, the solenoid 214 includes a spring 232 which supplies a force to the inner rod 212 that biases the inner rod 212 toward the second position. It will be appreciated, however, that in other embodiments the inner rod actuator 214 may be implemented using a motor, an electromechanical actuator, a hydraulic actuator, a mechanical actuator, or any one of numerous other types of electrical, electromechanical, hydromechanical, or mechanical devices.

Figure 3:
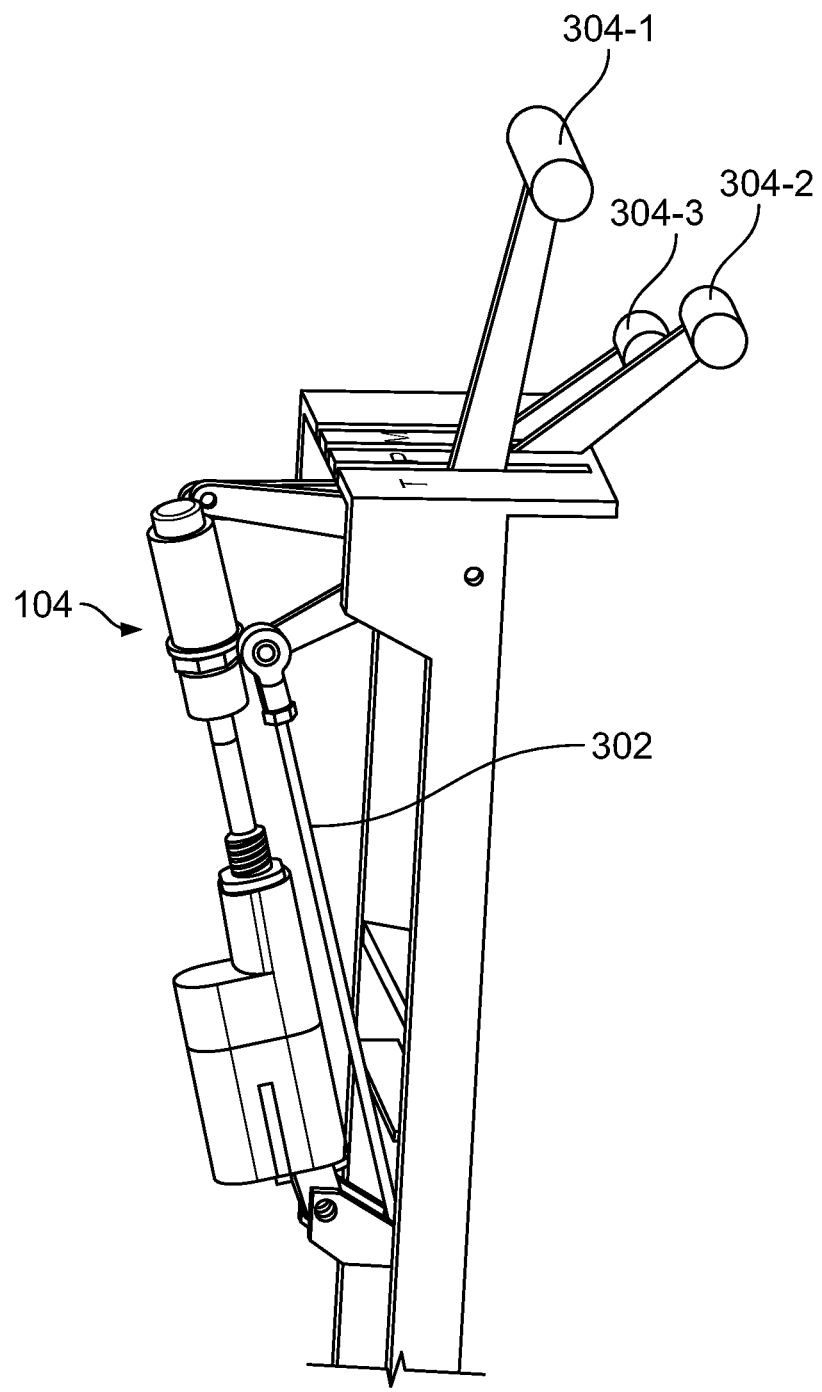
FIG. 3 depicts a plan view of one of the actuators of FIG. 2 installed in an aircraft environment.

As FIG. 2 also depicts, the inner rod actuator housing 228 is coupled to, and is thus movable with, the actuation tube 208. An arm 234 is coupled to, and extends from, the solenoid housing 228. As shown in FIG. 3, when each actuator 104 is installed in its end-use environment (e.g., an aircraft), a cable 302, such as a Bowden cable, and a control handle 304 (304-1, 304-2, 304-3) are coupled to the actuation tube 208 via the arm 234. The cable 302 and control handle 304 are thus movable with the actuation tube 208 when the actuation tube 208 is being translated in response to helical guide 206 rotation. The control handle 304 is preferably dimensioned to be grasped by a hand and to receive a force. As will be momentarily described, when the inner rod 212 is in the second position, application of a force to the control handle 304 will cause the actuation tube 208 to translate.

Returning now to FIG. 2, it is seen that the ramped surface 224 is formed on the inner rod 212. The detent ball 226 rests on the ramped surface 224 and is thus engaged by the inner rod 212. The detent ball 226 extends at least partially through an opening 235 that is formed in the actuation tube 208 and that extends between the inner surface 218 and the outer surface 216.

The detent ball 226 is movable between an engage position and a disengage position. The detent ball 226 is in the engage position when the inner rod 212 is in the first position. In the engage position, which is the position depicted in FIG. 2, the detent ball 226 engages the helical guide 206. The detent ball 226 is in the disengage position when the inner rod 212 is in the second position. In the disengage position, which is not depicted but will be readily understood to those skilled in the art, the detent ball 226 slides down the ramped surface 224 and thus does not engage the helical guide 206.

Thus, when the detent ball 226 is in the engage position, if a drive torque is supplied, via the motor 204, to the helical guide 206, the actuation tube 208 will translate. Conversely, when the detent ball 226 is in the disengage position, if a drive torque is supplied, via the motor 204, to the helical guide 206, the actuation tube 208 will not translate. However, the actuation tube 208 will translate if an axial force is supplied to the control handle 304 via, for example, a pilot (or other user).

Preferably, each actuator 104 additionally includes a drive gear 236, a driven gear 238, and an axial bearing assembly 242. The drive gear 236 is coupled to the motor 204 to receive the drive torque therefrom. In the depicted embodiment, the drive gear 236 is directly connected to the motor 204, but in other embodiments there could be intervening components. The driven gear 238 is meshed with the drive gear 236 and is coupled to the helical guide 206 via, for example, a press-fit, suitable hardware, or a combination thereof. Thus, as is readily apparent to persons skilled in the art, the driven gear 238 rotates in response to rotation of the drive gear 236, which in turn causes the helical guide 206 to rotate. The axial bearing assembly 242 is disposed between the helical guide 206 and the housing 202 to reduce wear.

During automated operation of the system 100, the controller 102, as noted previously, selectively supplies motor control signals to each of the actuators 104, and more specifically to each of the motors 204 on the actuators 104. Moreover, each inner rod actuator 214 will be commanded via, for example, the controller 102 or other power source to move the inner rods 212 to the first position. Each motor 204, upon receipt of its associated motor control signals, supplies a drive torque to its associated drive gear 236, which is transferred, via its associated driven gear 238, to its associated helical guide 206, causing the helical guide 206 to rotate. Because each of the inner rods 212 is in the first position, the associated detent balls 226 will be in the engage position. As a result, rotation of the helical guides 206 will cause the associated actuation tubes 208 to translate.

If, however, automated operation is disabled, inactivated, or otherwise unwanted, the inner rod actuators 214 will cause each of the inner rods 212 to move from the first position to the second position. This, as noted previously, will cause the associated detent balls 226 to move from the engage position to the disengage position. This means translation of the actuation tubes 208 is no longer responsive to its associated helical guide 206 rotation. Rather, the actuation tubes 208 will translate in response to a force being supplied thereto via, for example, its associated control handle 304. Although the helical guides 206 could still be rotated via the associated motors 204, when the inner rods 212 are in the second position, rotation of the helical guides 206 will not cause the associated actuation tubes 208 to translate. It should be noted that automated operation could be disabled/inactivated automatically within the controller 102, in response to a predetermined event, or disabled/inactivated via a disable switch 114 (see FIG. 1) that may be located on, or remotely from, the controller 102.

It should additionally be noted that the system 100 could be configured to disable automated operation of individual ones of the actuators 104. In one embodiment, as shown schematically in FIG. 1, this functionality may be implemented by including a switch 116 (116-1, 116-2, 116-3) for each actuator 104. Each switch 116 may be coupled, for example, to a different one of the control handles 304 and may be in operable communication with the controller 102 (or other power source). Each switch 116, when included, is movable between an activate position and a deactivate position. In the activate position, the controller 102 (or other power source) will command the associated inner rod actuator 214 move the inner rods 212 to the first position, and is operable to at least selectively energize the associated motor 204. In the deactivate position, the controller 102 (or other power source) will command the associated inner rod actuator 214 move the inner rods 212 to the second position.

The system described herein can be readily retrofit into existing piston engine powered aircraft to automate the throttle, mixture, and (when included) propeller controls.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An actuator, comprising:
   a housing;
   a motor mounted on the housing and coupled to receive motor control signals, the motor responsive to the motor control signals to rotate and supply a drive torque;
   a helical guide disposed at least partially within the housing, the helical guide coupled to receive the drive torque from the motor and configured, in response to the drive torque, to rotate in either a first rotational direction or a second rotational direction;
   a drive gear coupled to the motor to receive the drive torque therefrom;
   a driven gear meshed with the drive gear and having an opening therein through which the helical guide extends, the driven gear coupled to the helical guide to thereby supply the drive torque to the helical guide when the drive gear is rotating;
   an actuation tube disposed at least partially within the housing and having an inner surface that defines an actuation tube cavity, the actuation tube at least partially surrounded by the helical guide and configured, in response to rotation of the helical guide in the first rotational direction or the second rotational direction, to selectively translate in either a first axial direction or a second axial direction, respectively;
   an inner rod disposed within, and extending from, the actuation tube cavity, the inner rod movable between a first position, in which rotation of the helical guide causes the actuation tube to translate, and a second position, in which rotation of the helical guide does not cause the actuation tube to translate; and
   an inner rod actuator coupled to the inner rod and configured to move the inner rod between the first position and the second position.

2. The actuator of claim 1, further comprising:
   an axial bearing assembly disposed between the helical guide and the housing.

3. The actuator of claim 1, further comprising:
   an opening formed in the actuation tube and extending between the inner surface and an outer surface thereof; and
   a detent ball engaged by the inner rod and extending at least partially through the opening, the detent ball movable between an engage position and a disengage position,
   wherein:
   in the engage position, the detent ball engages the helical guide, and in the disengage position, the detent ball does not engage the helical guide.

4. The actuator of claim 3, wherein:
the detent ball is in the engage position when the inner rod is in the first position; and
the detent ball is in the disengage position when the inner rod is in the second position.

5. The actuator of claim 1, wherein the helical guide comprises a helical spring.

6. The actuator of claim 1, further comprising:
an inner rod actuator housing having the inner rod actuator disposed therein, the inner rod actuator housing coupled to, and moveable with, the actuation tube.

7. The actuator of claim 1, wherein:
the inner rod actuator comprises a solenoid; and
the solenoid is configured to (i) move the inner rod to the first position upon being energized and (ii) move the inner rod to the second position upon being deenergized.

8. An actuation control system for an aircraft piston engine, comprising:
a controller configured to selectively supply motor control signals; and
an actuator in operable communication with the controller, the actuator comprising:
a housing;
a motor mounted on the housing and coupled to receive the motor control signals, the motor responsive to the motor control signals to rotate and supply a drive torque;
a helical guide disposed at least partially within the housing, the helical guide coupled to receive the drive torque from the motor and configured, in response to the drive torque, to rotate in either a first rotational direction or a second rotational direction;
a drive gear coupled to the motor to receive the drive torque therefrom;
a driven gear meshed with the drive gear and having an opening therein through which the helical guide extends, the driven gear coupled to the helical guide to thereby supply the drive torque to the helical guide when the drive gear is rotating;
an actuation tube disposed at least partially within the housing and having an inner surface that defines an actuation tube cavity, the actuation tube at least partially surrounded by the helical guide and configured, in response to rotation of the helical guide in the first rotational direction or the second rotational direction, to selectively translate in either a first axial direction or a second axial direction, respectively;
an inner rod disposed within, and extending from, the actuation tube cavity, the inner rod movable between a first position, in which rotation of the helical guide causes the actuation tube to translate, and a second position, in which rotation of the helical guide does not cause the actuation tube to translate; and
an inner rod actuator coupled to the inner rod and configured to move the inner rod between the first position and the second position.

9. The actuation control system of claim 8, further comprising:
a control handle coupled to, and movable with, the actuation tube when the actuation tube is translating, the control handle dimensioned to be grasped by a hand and to receive a force,
wherein in the second position of the inner rod, application of the force to the control handle causes the actuation tube to translate.

10. The actuation control system of claim 8, further comprising:
an axial bearing assembly disposed between the helical guide and the housing.

11. The actuation control system of claim 8, further comprising:
an opening formed in the actuation tube and extending between the inner surface and an outer surface thereof; and
a detent ball engaged by the inner rod and extending at least partially through the opening, the detent ball movable between an engage position and a disengage position,
wherein:
in the engage position, the detent ball engages the helical guide, and
in the disengage position, the detent ball does not engage the helical guide.

12. The actuation control system of claim 11, wherein:
the detent ball is in the engage position when the inner rod is in the first position; and
the detent ball is in the disengage position when the inner rod is in the second position.

13. The actuation control system of claim 8, wherein the helical guide comprises a helical spring.

14. The actuation control system of claim 8, further comprising:
an inner rod actuator housing having the inner rod actuator disposed therein, the inner rod actuator housing coupled to, and moveable with, the actuation tube.

15. The actuation control system of claim 8, wherein:
the inner rod actuator comprises a solenoid; and
the solenoid is configured to (i) move the inner rod to the first position upon being energized and (ii) move the inner rod to the second position upon being deenergized.

16. An actuation control system for an aircraft powered by a piston engine, the actuation system comprising:
a controller configured to selectively supply a plurality of motor control signals; and
a plurality of actuators in operable communication with the controller, wherein each actuator comprises:
a housing;
a motor mounted on the housing and coupled to receive one of the motor control signals from the controller, the motor responsive to the received motor control signals to rotate and supply a drive torque;
a helical guide disposed at least partially within the housing, the helical guide coupled to receive the drive torque from the motor and configured, in response to the drive torque, to rotate in either a first rotational direction or a second rotational direction;
a drive gear coupled to the motor to receive the drive torque therefrom;
a driven gear meshed with the drive gear and having an opening therein through which the helical guide extends, the driven gear coupled to the helical guide to thereby supply the drive torque to the helical guide when the drive gear is rotating;
an actuation tube disposed at least partially within the housing and having an inner surface that defines an actuation tube cavity, the actuation tube at least partially surrounded by the helical guide and configured, in response to rotation of the helical guide in the first rotational direction or the second rotational direction, to selectively translate in either a first axial direction or a second axial direction, respectively;

a control handle coupled to, and movable with, the actuation tube when the actuation tube is translating, the control handle dimensioned to be grasped by a hand and to receive a force;

an inner rod disposed within, and extending from, the actuation tube cavity, the inner rod movable between a first position, in which rotation of the helical guide causes the actuation tube to translate, and a second position, in which rotation of the helical guide does not cause the actuation tube to translate but application of the force to the control handle causes the actuation tube to translate; and a solenoid coupled to the inner rod and configured, upon being energized, to move the inner rod to the first position and, upon being deenergized, to move the inner rod to the second position.

17. The actuation control system of claim 16, further comprising:

an axial bearing assembly disposed between the helical guide and the housing.

18. The actuation control system of claim 16, further comprising:

an opening formed in the actuation tube and extending between the inner surface and an outer surface thereof; and a detent ball engaged by the inner rod and extending at least partially through the opening, the detent ball movable between an engage position and a disengage position, wherein:
the detent ball is in the engage position when the inner rod is in the first position,
the detent ball is in the disengage position when the inner rod is in the second position,
in the engage position, the detent ball engages the helical guide, and
in the disengage position, the detent ball does not engage the helical guide.

* * * * *